United States Patent [19]

Fudickar et al.

[11] Patent Number: 4,609,100
[45] Date of Patent: Sep. 2, 1986

[54] CLAMPING DEVICE FOR BELTS

[75] Inventors: Harald Fudickar, Wuppertal; Peter Thies, Ennepetal, both of Fed. Rep. of Germany

[73] Assignee: Wagener Schwelm GmbH & Co., Schwel, Fed. Rep. of Germany

[21] Appl. No.: 623,995

[22] Filed: Jun. 25, 1984

[51] Int. Cl.[4] .............................................. B65G 35/00
[52] U.S. Cl. ................... 198/854; 100/258 A; 100/269 A; 100/269 R; 100/270; 100/290; 100/295; 156/580
[58] Field of Search ............. 100/93 P, 258 A, 258 R, 100/269 A, 269 R, 270, 271, 289, 290, 295, 162 B; 156/580, 581, 583.3, 583.5, 583.6, 583.91; 226/158, 162; 198/854, 856

[56] References Cited

U.S. PATENT DOCUMENTS

| | | | |
|---|---|---|---|
| 3,190,215 | 6/1965 | Howard et al. | 100/269 A |
| 3,905,290 | 9/1975 | Caughey | 100/295 X |
| 4,157,771 | 6/1979 | Smith | 100/289 X |
| 4,187,776 | 2/1980 | Schroder | 100/93 P |
| 4,388,860 | 6/1983 | Thies | 100/270 |
| 4,480,459 | 11/1984 | Feldman et al. | 100/162 B X |

FOREIGN PATENT DOCUMENTS 3028400 9/1982 Fed. Rep. of Germany .
3028401 9/1982 Fed. Rep. of Germany .

*Primary Examiner*—Joseph E. Valenza
*Assistant Examiner*—Lyle Kim
*Attorney, Agent, or Firm*—Karl F. Ross; Herbert Dubno

[57] ABSTRACT

A clamping device for conveyor belts has a pair of crossbars disposed on opposite sides of the conveyor belt and clamping bars each disposed between a respective crossbar and the conveyor belt. The device is mounted through the clamping bars and a hydraulic unit such as deformable hoses or an array of piston-and-cylinder units is braced between one of the clamping bars and the respective crossbar.

3 Claims, 3 Drawing Figures

CLAMPING DEVICE FOR BELTS

FIELD OF THE INVENTION

Our present invention relates to a belt clamp and, more particularly, to a clamping device for clamping a conveyor belt with a prescribed force, e.g. in association with a belt press, with mechanisms or devices for establishing or adjusting conveyor belt tension, for braking the motion of a conveyor belt and for use for guiding and tensioning mechanisms of any desired type.

Belt presses which utilize clamping devices of the type described herein or which can utilize such clamping devices are disclosed inter alia in the commonly assigned U.S. Pat. Nos. 4,398,991, 4,388,860, 4,393,666, 4,423,674 and 4,426,573. Reference may also be had to the patent documents of record in the files of these patents.

BACKGROUND OF THE INVENTION

It is known to provide clamping devices for the afore-described purposes which can consist of an upper crossbar or traverse, a lower crossbar or traverse and tensioning bolts connected to these two traverses, i.e. so-called drawbolts. The upper and lower traverses have surfaces which are adapted to engage directly the upper and lower surfaces of the conveyor belt. A support can be provided for the entire assembly. The drawbolts can be tightened by a torque wrench to prescribed torque settings and hydraulic actuators can be provided for them if desired.

Since the drawbolts flank the belt and act at the ends of the traverses, the latter are subjected to a more or less arcuate elastic deformation so that the clamping force and hence the belt-holding force is not uniformly distributed over the entire lengths of the crossbars.

The edges of the conveyor belt may be clamped more strongly or tightly than central regions of the conveyor belt and frequently the edge regions can show damage resulting from excessive local clamping force. The mounting for the assembly is attached directly to the crossbars or to one of them. As a result, the crossbars may be subjected to a complex stress pattern which can impair the stability of the clamping device when high tensile forces are applied to the conveyor belt. Should the system break down, there is danger to personnel as well as to the product being clamped.

OBJECTS OF THE INVENTION

It is the principal object of the present invention to provide a clamping device for the purposes and of the type described whereby the belt-holding force can be more uniformly distributed over the width of the clamped conveyor belt and whereby the aforementioned dangers or disadvantages of stability phenomena and unpredictable stress patterns no longer arise.

Another object of the invention is to provide an improved clamping device in which, notwithstanding the fact that the drawbolts act at the ends of the crossbars or traverses, a highly uniform clamping-force distribution is achieved over the width of the belt.

Yet another object of this invention is to provide a conveyor-belt clamp which obviates the disadvantages of the prior art and can provide improved clamping conditions for the conveyor belt.

SUMMARY OF THE INVENTION

These objects and others which will become apparent hereinafter are attained, in accordance with the invention, in a belt press having traverses or crossbars of the type described and drawbolts interconnecting these crossbars at the ends thereof to opposite sides of a conveyor belt clamped between the crossbars, wherein the clamp also comprises a pair of clamping bars each interposed between a respective one of the crossbars and a respective surface of the belt, the clamping bars being formed at their ends with holes traversed with clearance by the drawbolts, at least one of these clamping bars being braced relative to the respective crossbars by hydraulic pressurizing or bracing means effecting a uniform force distribution across the width of the belt, the mounting being connected to one of these clamping bars so that the latter is held or guided on the support directly.

The hydraulic bracing means can thus set up or transmit the clamping force.

The hydraulic bracing means can include a number of hydraulic piston-and-cylinder units disposed in succession across the width of the belt between the respective clamping bars and the associated crossbar, or an expandable member extending the full width of the belt between the clamping bar and the respective force bar and expandable by hydraulic fluid pressure. In either case, the hydraulic fluid pressure can be supplied by a pump.

In order to minimize the weight of the clamping device when high forces are involved, the crossbars are formed as box sections, i.e. box profiles of rectangular cross section, while the clamping bars are formed as channels which can be open in the direction of the respective crossbars to receive the hydraulic bracing means.

The belt-holding forces securing a clamped conveyor belt can be separated on the one hand cleanly from the guiding forces or the clamping bars on the other hand by maintaining the aforementioned clearance between the walls of the holes in the clamping bars and the drawbolts.

If one of the clamping bars is then fixed to the support, the stresses with which the conveyor belt is clamped can be sustained by the crossbars without any of the problems encountered heretofore and significant clamping forces can be generated without concern that deformations in the clamping bars created by the belt-holding forces will be transmitted to the crossbars or the hydraulic unit.

The form of the hydraulic unit can be, in principle, optional as long as the hydraulic unit is able to brace between the clamping bar and the crossbar and to distribute the forces uniformly over the length of the clamping bar and hence the width of the conveyor belt. As noted, it may consist of a collection of piston-and-cylinder units spaced over the length of the associated crossbar and either connected to a pump or adapted to be pressurized by tightening the drawbolt. In the latter case, a valve may close off the hydraulic lines connected to the cylinders from the pump. In this case, moreover, the piston-and-cylinder units of each crossbar are combined in a closed hydraulic system. Preferably the hydraulic unit comprises hoses, which are deformable in cross section, and a deflection compensator. The hydraulic hoses can be connected to a pump. Arrangements using hydraulic hoses, bending characteristic or deflection compensators and the like are known from German patent documents DE-OS 30 28 400 and DE-OS 30 28 401 and British application GB 2 082 966. They can be used in conjunction with the instant invention as well.

There are numerous advantages to the improved system of the invention many of which will become apparent without discussion, but others of which are outlined here. For example, the belt-holding force is cleanly separated from the clamping forces applied through the hydraulic unit. The clear separation of such forces eliminates an interplay which may result in complex stresses. Deformations of the clamping bar or bars under belt-holding forces are not transmitted to the hydraulic unit or the associated crossbars. The loading and stressing conditions are thus more predictable and disadvantageous three-dimensional-stress distributors are eliminated. The clamping device can be made particularly light in weight while being functionally reliable.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
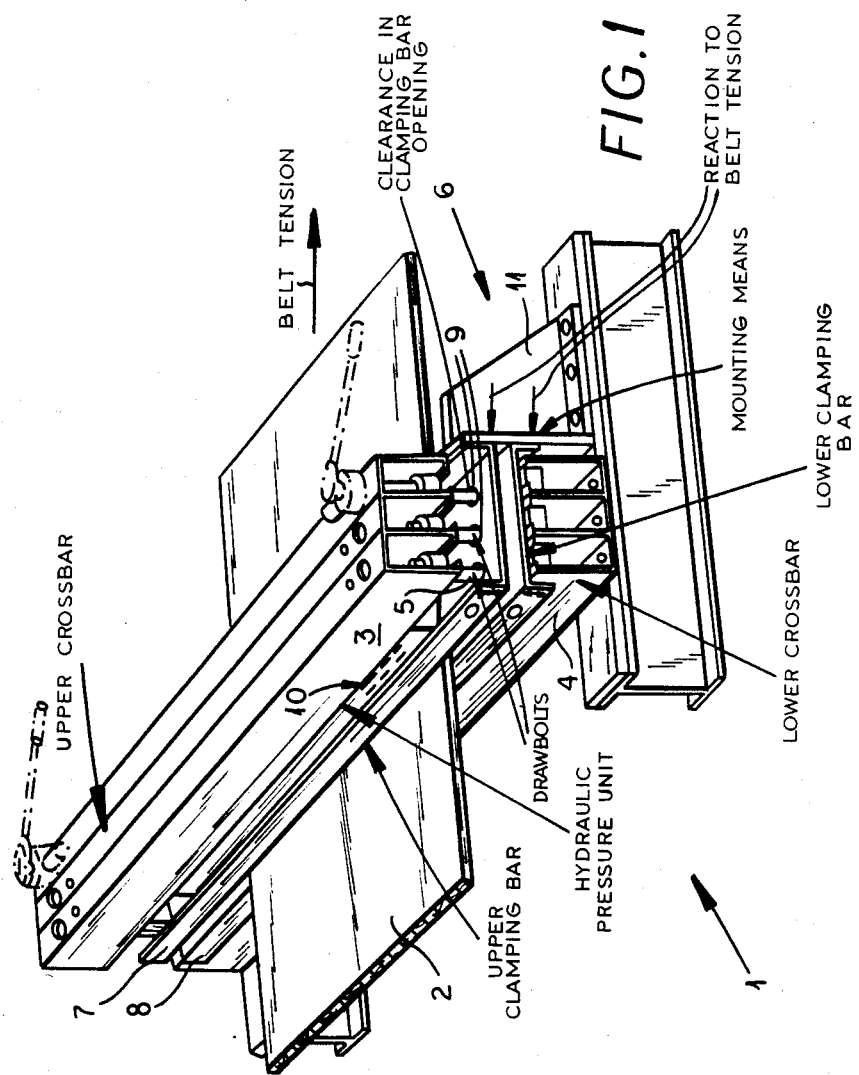
FIG. 1 is a perspective view of a clamping device in accordance with the invention diagrammatically showing a conveyor belt in place.
Figure 2:
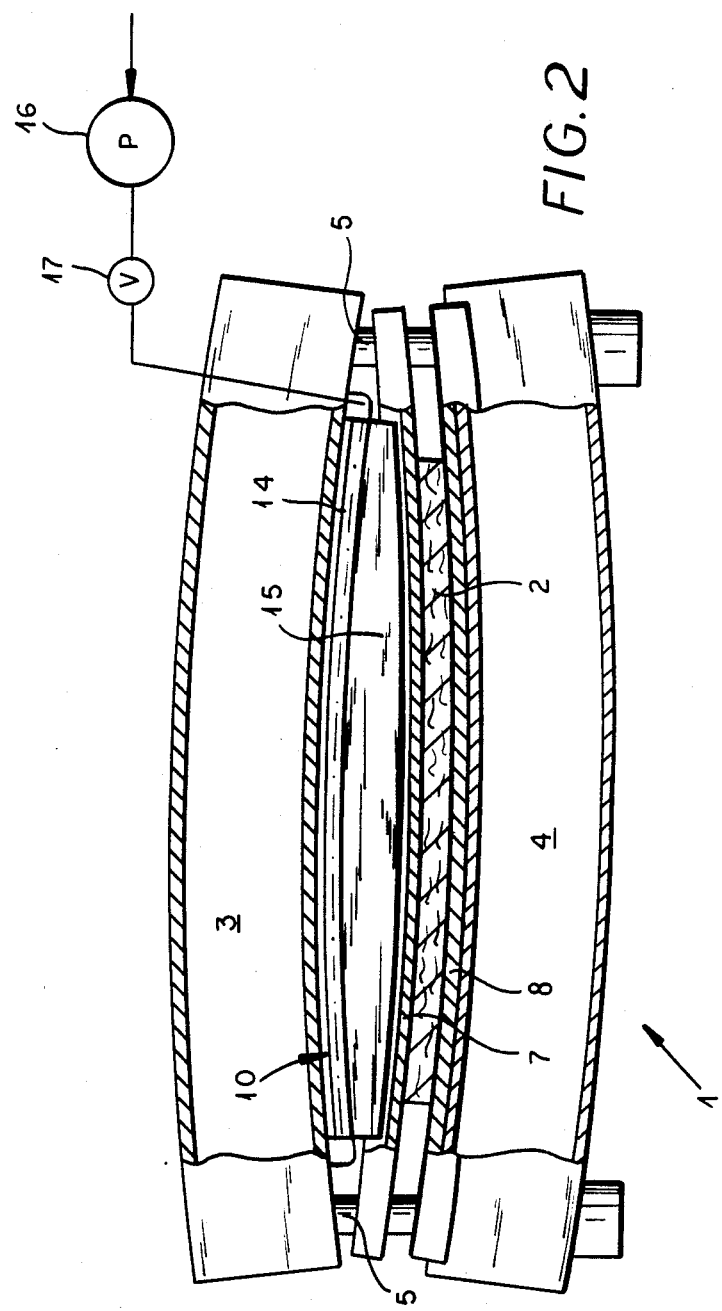
FIG. 2 is a diagrammatic cross-sectional view, drawn to a larger scale than FIG. 1 and illustrating one type of hydraulic unit.
Figure 3:
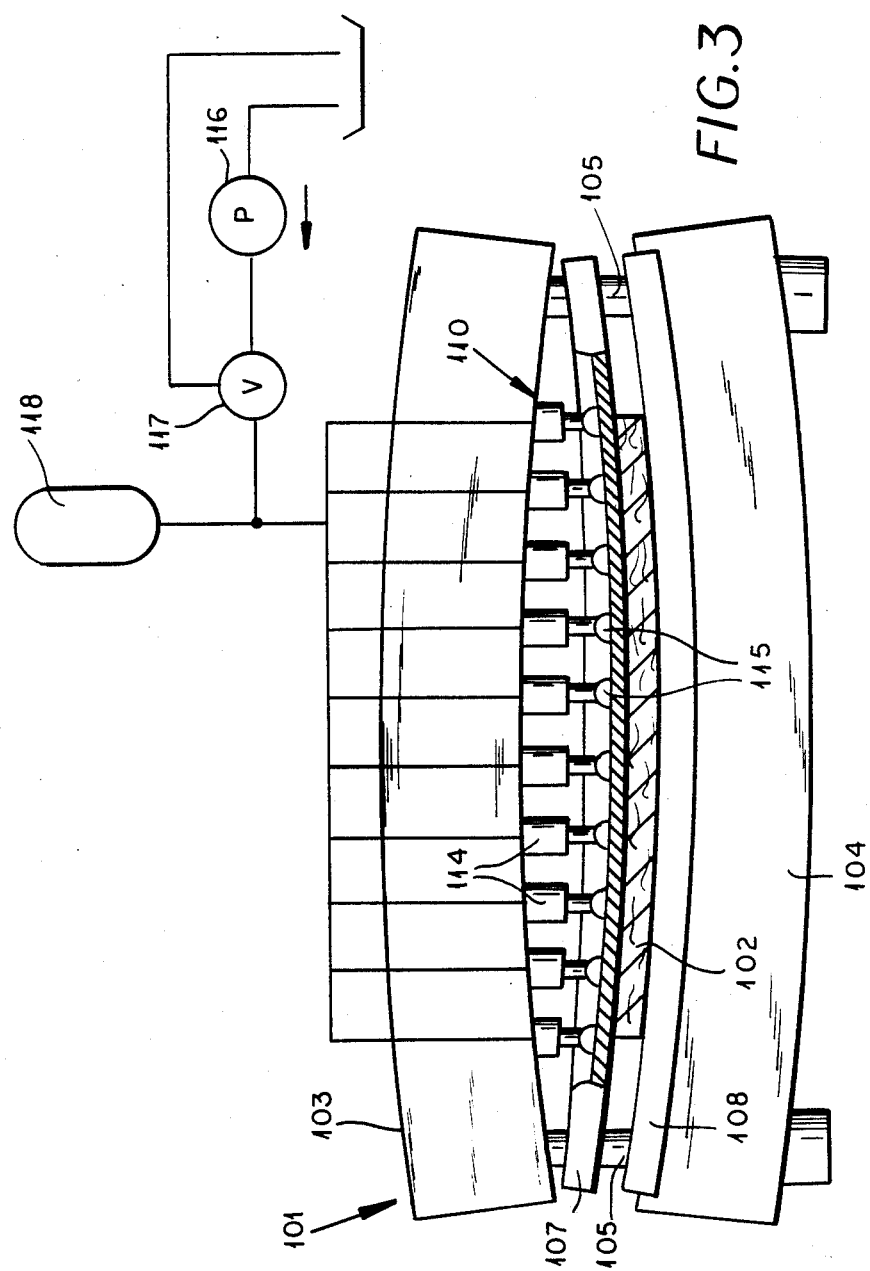
FIG. 3 is a view similar to FIG. 2 but showing only the upper clamping bar in cross section to reveal a different hydraulic bracing arrangement.

The clamping device 1 shown in FIGS. 1 and 2 of the drawing and to the extent that it contains similarly functioning structural elements with the same reference numerals, the clamping device 101 of FIG. 3, are intended for the clamping of conveyor belts 2 and 102 with prescribed clamping forces. The clamping devices can be used in or in association with belt-containing or traction-braking, guiding and adjusting mechanisms. The basic construction of the clamping device is an upper crossbar 3, 103, a lower crossbar 4, 104, drawbolts 5, 105 interconnecting the ends of the crossbars 103 and 104, and a mounting 6 which enables the assembly of crossbars and the entire clamping device to be supported in the apparatus. The clamped conveyor belt 2, 102 is similarly held by this mounting 6, e.g. to allow a tensile stress to be applied to the belt.

The crossbars 3, 103 and 4, 104 are provided with respective clamping bars 7, 107 and 8, 108 which directly engage the upper and lower surfaces of the belt 2, 102.

The crossbars each have holes 9 through which the bolts 5, 105 pass with clearance.

Vital to the invention is the fact that each clamping bar 7, 107 is braced against the respective crossbar 3, 103 by a respective hydraulic unit 10, 110 which sets up or transmits the clamping force.

FIG. 1 shows that the mounting 6, includes a bracket 11 along the left-hand flank of which the clamping bars 7 and/or 8 are vertically guided. Similar means are provided for the clamping bars 107 and 108 of FIG. 3.

The means for affixing the clamping bars to the mounting are arranged so that deformations of either clamping bar 7 or 8 (or 107, 108) are not transmitted to the associated crossbar 3, 4 or 103, 104 and the corresponding hydraulic unit 10, 110.

This insures that the belt-holding forces on the one hand and the clamping forces set up by the hydraulic unit on the other are separated from one another and thus eliminates complex stress patterns on the clamp.

The crossbars 3, 4 and 103, 104 are formed by horizontally stacked box-section steel members while the clamping bars 7, 8 and 107, 108 are formed as upwardly open channel sections.

In the embodiment of FIGS. 1 and 2 hydraulic unit 10 comprises hydraulic hoses 14 of deformable cross section which lie against a deflection compensator 15 and can be expanded by hydraulic pressure supplied by a pump 16 via a valve 17.

The latter system can be similar to that described in German patent document DE-OS 30 28 401.

In FIG. 3, however, a multiplicity of piston-and-cylinder units 114 can be provided and can be braced via swivel shoes 115 against the clamping bar 107. The pump 116 supplies hydraulic fluid to these cylinders via the valve 117 and a pressure accumulator 116 can be connected in this circuit in the embodiments of both FIGS. 2 and 3, the valve 17 or 117 can be closed and the pump deenergized to block from the hydraulic lines and allow the hydraulic force to be generated by tightening the drawbolts 5 and 105.

We claim:

1. A clamping device for engaging a conveyor belt with a substantially vertical clamping force generally perpendicular to the belt and with substantially horizontal belt-holding force generally in line with the belt, said clamping device comprising:

an upper crossbar and a lower crossbar disposed respectively above and below a conveyor belt;

drawbolts interconnecting the ends of said crossbars;

a respective clamping bar disposed between each cross bar and said belt, said clamping bars having openings at their ends traversed by said bolts with clearance;

a hydraulic pressure unit braced between one of said clamping bars and the respective crossbar for distributing clamping force over the length thereof and the width of said conveyor; and mounting means for horizontally limiting movement of at least one of said clamping bars against said horizontal belt holding force, said at least one of said clamping bars vertically slidably abutting against said mounting means for resisting said horizontal belt holding force said crossbars being each formed from at least one box-cross-section member and each of said clamping bars being formed as a respective channel-shaped member, said hydraulic pressure unit being a plurality of piston-and-cylinder units spaced apart along the length of said one of said clamping bars.

2. The clamping device defined in claim 1, further comprising a pump connected to said piston-and-cylinder units for pressurizing same.

3. The clamping device defined in claim 1 wherein said piston-and-cylinder units are connected in a closed system and are pressurized by the tightening of said bolts.

* * * * *